United States Patent [19]
Sung

[11] Patent Number: 5,061,291
[45] Date of Patent: Oct. 29, 1991

[54] ORI-INHIBITED MOTOR FUEL COMPOSITION AND STORAGE STABLE CONCENTRATE

[75] Inventor: Rodney L. Sung, Fishkill, N.Y.

[73] Assignee: Texaco Inc., White Plains, N.Y.

[21] Appl. No.: 440,636

[22] Filed: Dec. 28, 1989

Related U.S. Application Data

[63] Continuation-in-part of Ser. No. 152,227, Feb. 4, 1988, abandoned, and a continuation-in-part of Ser. No. 211,937, Jun. 27, 1988, abandoned.

[51] Int. Cl.$^5$ .................. C10L 1/22; C07D 207/40
[52] U.S. Cl. ...................... 44/347; 548/545; 548/546; 548/547
[58] Field of Search ............ 548/547, 546, 545; 252/51.5 A; 44/63, 347

[56] References Cited

U.S. PATENT DOCUMENTS

| | | | |
|---|---|---|---|
| 2,662,898 | 12/1953 | Ross et al. | 548/547 |
| 3,525,693 | 8/1970 | Lyle et al. | 548/547 |
| 4,477,261 | 10/1984 | Sung | 44/63 |
| 4,581,040 | 4/1986 | Sung et al. | 44/63 |
| 4,631,069 | 12/1986 | Sung | 44/63 |
| 4,643,737 | 2/1987 | Sung et al. | 44/63 |
| 4,643,738 | 2/1987 | Sung et al. | 44/63 |
| 4,659,336 | 4/1987 | Sung et al. | 44/63 |
| 4,659,337 | 4/1987 | Sung | 44/63 |
| 4,689,051 | 8/1987 | Sung | 44/63 |
| 4,747,851 | 5/1988 | Sung et al. | 44/72 |
| 4,810,261 | 3/1989 | Sung et al. | 44/63 |
| 4,839,073 | 6/1989 | Gutierrez et al. | 548/547 |
| 4,852,993 | 8/1989 | Sung et al. | 44/63 |
| 4,865,622 | 9/1989 | Sung | 44/63 |
| 4,906,252 | 3/1990 | Gutierrez et al. | 548/547 |
| 4,938,880 | 7/1990 | Waddoups et al. | 252/51.5 A |
| 4,968,321 | 11/1990 | Sung et al. | 44/459 |

*Primary Examiner*—Prince E. Willis
*Assistant Examiner*—Jerry D. Johnson
*Attorney, Agent, or Firm*—Robert A. Kulason; James J. O'Loughlin; Robert B. Burns

[57] ABSTRACT

A motor fuel composition which inhibits engine ORI and intake valve deposit formation comprises a mixture of hydrocarbons boiling in the range of 90°–450° F. and the reaction product of a hydrocarbyl-substituted dibasic acid anhydride and a polyoxyalkylene diamine; it may optionally additionally comprise a polymeric component which is a polyolefin polymer, copolymer, or the corresponding aminated or hydrogenated polymer or copolymer, or mixtures thereof, of a $C_2$–$C_{10}$ hydrocarbon. Motor fuel compositions of the instant invention show improved ORI control in comparison with typical commercial fuel compositions. The instant invention is advantageous in that it may be produced and stored as a precipitation-resistant concentrate composition.

36 Claims, 2 Drawing Sheets

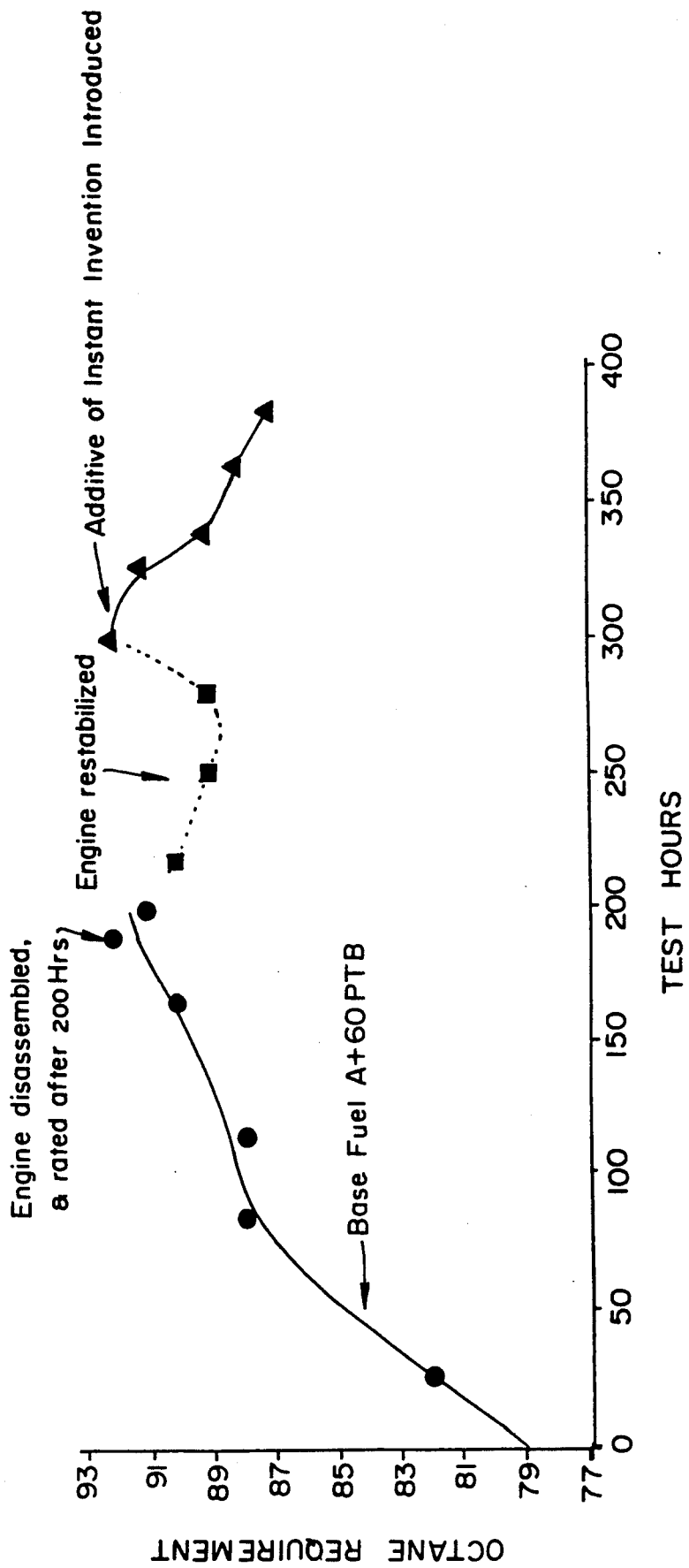

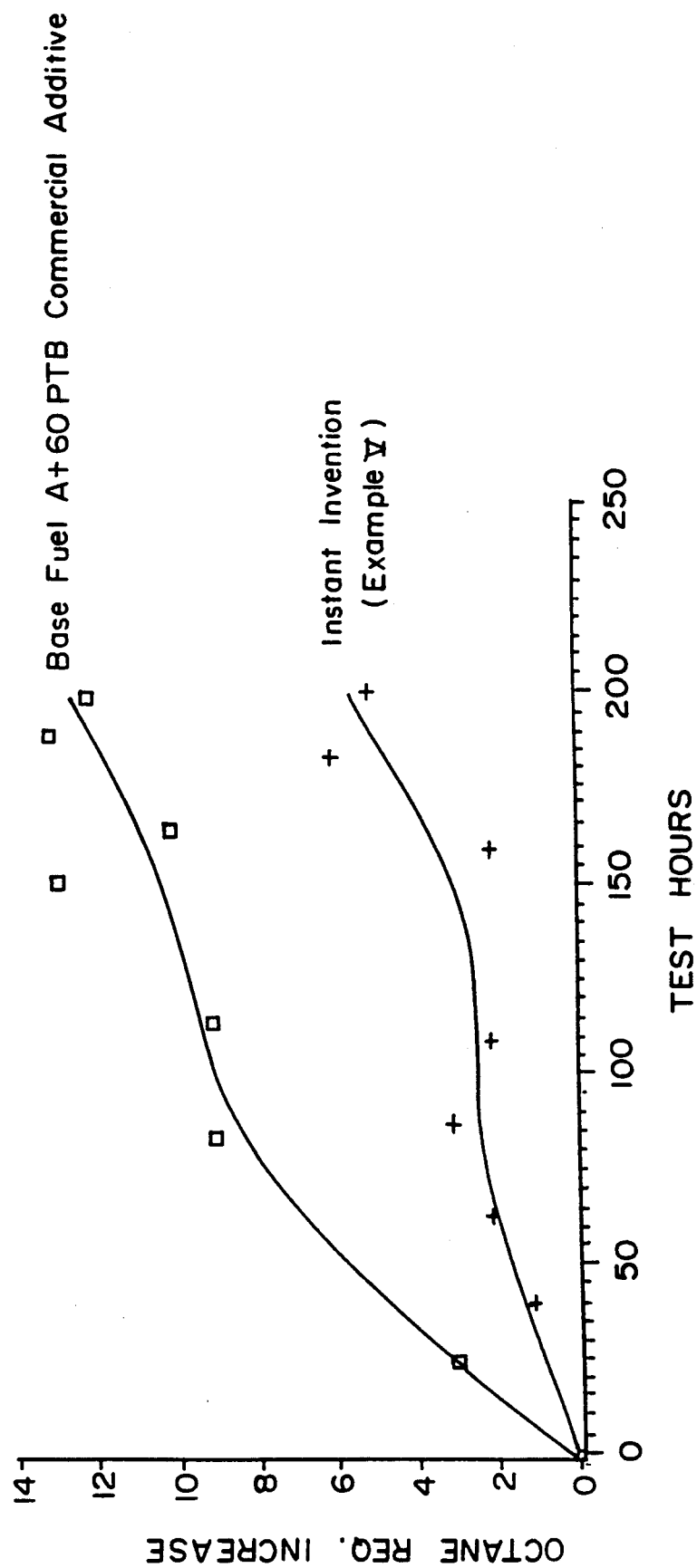

ORI-INHIBITED MOTOR FUEL COMPOSITION AND STORAGE STABLE CONCENTRATE

CROSS-REFERENCE TO RELATED APPLICATION

This application is a continuation-in-part of U.S. application Ser. No. 07/152,227, filed Feb. 4, 1988, now abandoned, and a continuation-in-part of application Ser. No. 07/211,937 filed on June 27, 1988, now abandoned.

BACKGROUND OF THE INVENTION

1. Field of the Invention

This invention relates to a novel reaction product composition, an ORI-inhibIted motor fuel composition, a bi functional deposit- and ORI- inhibited motor fuel composition, and a precipitation-resistant concentrate formulation for use in motor fuel compositions. More particularly, this invention relates to a composition obtained by reacting a hydrocarbyl-substituted dibasic acid anhydride and a polyoxyalkylene diamine, an ORI-inhibited motor fuel composition comprising a base fuel containing the reaction product of (i) a hydrocarbyl-substituted dibasic acid anhydride and a (ii) polyoxyalkylene diamine and an optional polymeric component which is a polyolefin polymer/copolymer or the corresponding aminated or hydrogenated polymer/copolymer, or mixtures thereof, of a $C_2$–$C_{10}$ hydrocarbon. The instant invention also relates to additive concentrates of the abovedescribed components in admixture with a hydrocarbon solvent which facilitates introduction of the concentrate into a motor fuel composition. Such concentrates are precipitation-resistant, thereby enhancing the storage stability of the concentrate.

2. Information Disclosure Statement

Combustion of a hydrocarbon motor fuel in an internal combustion engine generally results in the formation and accumulation of deposits on various parts of the combustion chamber as well as on the fuel intake and exhaust systems of the engine. The presence of deposits in the combustion chamber seriously reduces the operating efficiency of the engine. First, deposit accumulation within the combustion chamber inhibits heat transfer between the chamber and the engine cooling system. This leads to higher temperatures within the combustion chamber, resulting in increases in the end gas temperature of the incoming charge. Consequently, end gas auto-ignition occurs, which causes engine knock. In addition, the accumulation of deposits within the combustion chamber reduces the volume of the combustion zone, causing a higher than design compression ratio in the engine. This, in turn, also results in serious engine knocking. A knocking engine does not effectively utilize the energy of combustion. Moreover, a prolonged period of engine knocking will cause stress fatigue and wear in vital parts of the engine. The above-described phenomenon is characteristic of gasoline powered internal combustion engines. It is usually overcome by employing a higher octane gasoline for powering the engine, and hence has become known as the engine octane requirement increase (ORI) phenomenon. It would therefore be highly advantageous if engine ORI could be substantially reduced or eliminated by preventing or modifying deposit formation in the combustion chambers of the engine.

Another problem common to internal combustion engines relates to the accumulation of deposits in the carburetor which tend to restrict the flow of air through the carburetor at idle and at low speed, resulting in an overrich fuel mixture. This condition also promotes incomplete fuel combustion and leads to rough engine idling and engine stalling. Excessive hydrocarbon and carbon monoxide exhaust emissions are also produced under these conditions. It would therefore be desirable from the standpoint of engine operability and overall air quality to provide a motor fuel composition which minimizes or overcomes the above-described problems.

A third problem common to internal combustion engines is the formation of intake valve deposits. Intake valve deposits interfere with valve closing and eventually result in valve burning. Such deposits interfere with valve motion and valve sealing, and in addition reduce volumetric efficiency of the engine and limit maximum power. Valve deposits are usually a result of thermal and oxidative unstable fuel or lubricating oil oxidation products. Hard carbonaceous deposits collect in the tubes and runners that conduct ther exhaust gas recirculation (EGR) gases. These deposits are believed to be formed from exhaust particles which are subjected to rapid cooling while mixing with the air-fuel mixture. Reduced EGR flow can result in engine knock and $NO_x$ emission increases. It would therefore be desirable to provide a motor fuel composition which minimizes or overcomes the formation of intake valve deposits.

Various motor fuel formulations comprising polyoxyalkylene reaction product additives have been disclosed which prevent or minimize combustion chamber deposit formation, and hence minimize engine ORI. For example, co-assigned U.S. Pat. No. 4,852,993 filed Aug. 12, 1987 and incorporated herein by reference discloses a motor fuel composition comprising (I) the reaction product of the polyoxyalkylene diamine of co-assigned U.S. Pat. No. 4,747,851, discussed infra, a dibasic acid anhydride, and a hydrocarbyl polyamine, and (II) a mixture comprising polyisobutylene ethylene diamine and polyisobutylene in a hydrocarbon solvent. However, it has been found that a concentrate composition comprising components (I) and (II) precipitates during storage, which is undesirable. Other motor fuel compositions comprising polyoxyalkylene additives to reduce engine ORI include the following references, all incorporated herein by reference:

Co-assigned U.S. Pat. No. 4,747,851, filed Jan. 2, 1987 discloses a novel polyoxyalkylene diamine compound of the formula:

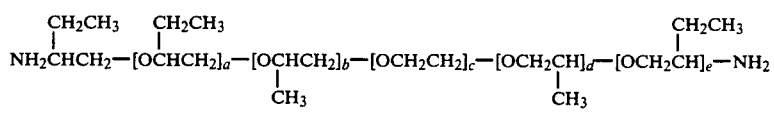

where c has a value from about 5–150, b+d has a value from about 5–150, and a+e has a value from about 2–12. Motor fuel compositions comprising the novel polyoxyalkylene diamine, alone or in combination with a polymer/copolymer additive are also disclosed;

Co-assigned U.S. patent application Ser. No. 000,230, filed Jan. 2, 1987 now abandoned discloses a motor fuel composition comprising the reaction product of the polyoxyalkylene diamine of U.S. patent application Ser. No. 000,253, a dibasic acid anhydride, and a hydrocarbyl polyamine. An optional additional polymer/copolymer additive with a molecular weight of 500-3500 may also be employed in conjunction with the reaction product additive;

Co-assigned U.S. Pat. No. 4,659,337 discloses the use of the reaction product of maleic anhydride, a polyether polyamide containing oxyethylene and oxypropylene ether moieties, and a hydrocarbyl polyamine in a gasoline motor fuel to reduce engine ORI and provide carburetor detergency;

Co-assigned U.S. Pat. No. 4,659,336 discloses the use of the mixture of: (i) the reaction product of maleic anhydride, a polyether polyamine containing oxyethylene and oxypropylene ether moieties, and a hydrocarbyl polyamine; and (ii) a polyolefin polymer/copolymer as an additive in motor fuel compositions to reduce engine ORI;

Co-assigned U.S. Pat. No. 4,631,069 discloses an alcohol-containing motor fuel composition which additionally comprises an anti-wear additive which is the reaction product of a dibasic acid anhydride, a polyoxyisopropylene diamine of the formula

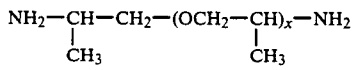

where x has a value of 2-68, and an n-alkyl-alkylene diamine;

Co-assigned U.S. Pat. No. 4,643,738 discloses a motor fuel composition comprising a deposit-control additive which is the reaction product of a dibasic acid anhydride, a polyoxyisopropylene diamine of the formula

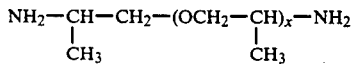

where x has a value of 2-50, and an n-alkyl-alkylene diamine;

U.S. Pat. No. 4,604,103 discloses a motor fuel deposit control additive for use in internal combustion engines which maintains cleanliness of the engine intake system without contributing to combustion chamber deposits or engine ORI. The additive disclosed is a hydrocarbyl polyoxyalkylene polyamine ethane of molecular weight range 300-2500 having the formula $$R-(OCH_2CH)_x-OCH_2CH_2-NR''R'''$$
$$\quad\quad\quad\quad | $$
$$\quad\quad\quad\quad R'$$

where R is a hydrocarbyl radical of from 1 to about 30 carbon atoms; R' is selected from methyl and ethyl; x is an integer from 5 to 30; and R" and R''' are independently selected from hydrogen and $-(CH_2CH_2NH-)_y-H$ where y is an integer from 0-5; and Co-assigned U.S. Pat. No. 4,581,040 discloses the use of a reaction product as a deposit inhibitor additive in fuel compositions. The reaction product is a condensate product of the process comprising:

(i) reacting a dibasic acid anhydride with a polyoxyisopropylenediamine of the formula

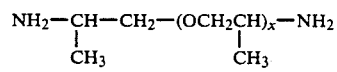

where x is a numeral of about 2-50, thereby forming a maleamic acid;

(ii) reacting said maleamic acid with a polyalkylene polyamine, thereby forming a condensate product; and (iii) recovering said condensate product.

Motor fuel compositions which contain amine additives to control deposition include the following:

U.S. Pat. No. 4,357,148 discloses a motor fuel additive useful in controlling ORI which is the combination of (a) an oil-soluble aliphatic polyamine containing at least one olefinic polymer chain, and (b) a polymer, copolymer, or corresponding hydrogenated polymer or copolymer of a $C_2$-$C_6$ mono olefin with a molecular weight of 500-1500;

U.S. Pat. No. 4,166,726 discloses a fuel additive which is the combination of (i) the reaction product of an alkylphenol, an aldehyde, and an amine, and (ii) a polyalkylene amine;

U.S. Pat. No. 3,960,515 and U.S. Pat. No. 3,898,056 disclose the use of a mixture of high and low molecular weight hydrocarbyl amines as a detergent and dispersant in motor fuel compositions; and U.S. Pat. No. 3,438,757 discloses the use of hydrocarbyl amines and polyamines with a molecular weight range of 450-10,000, alone or in combination with a lubricating mineral oil, as a detergent for motor fuel compositions.

An object of this invention to provide a reaction product composition which may be employed as an ORI-reducing additive in motor fuel compositions. Another object of this invention is to provide a method of blending the reaction product composition of the instant invention, either alone or in combination with the hereindescribed polyolefin polymer/copolymer, into a base motor fuel composition. Another object of this invention is to provide a motor fuel composition which is deposit-resistant and exhibits ORI-inhibition when employed in an internal combustion engine. Yet another object of this invention is to provide a concentrate composition which may be added to a motor fuel to provide motor fuel compositions of the instant invention.

It is a feature of motor fuel compositions of the instant invention that combustion chamber deposit formation is minimized, with concomitant reduction of engine ORI. It is another feature of this invention that such motor fuel composition are deposit-resistant and specifically exhibit reduced intake valve deposit formation. It is yet another feature of this invention that the concentrate composition of this invention may be admixed with a motor fuel to minimize combustion chamber deposit formation, and hence inhibit engine ORI.

It is an advantage of this invention that motor fuel compositions of the instant invention exhibit reduced engine ORI and reduced valve deposit formation. It is another advantage of this invention that concentrate compositions of the instant invention exhibit esistance to precipitation, and thereby have enhanced storage stability.

SUMMARY OF THE INVENTION

According to this invention, a novel reaction product which provides ORI-inhibiting properties to a motor fuel composition is obtained by reacting, at a temperature of 30° C.-200° C.:

(a) 1.5-2.5 moles, preferably 2 moles of hydrocarbyl-substituted dibasic acid anhydride of the formula

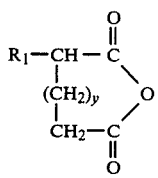

where $R_1$ is a hydrocarbyl radical, preferably a polypropenyl or polybutenyl radical, most preferably a polyisobutenyl radical, having a molecular weight in the range of 500–10,000, preferably 500–2500, most preferably 600–1500 and y has a value of 0–3; and (b) 0.5–1.5 moles, preferably 1 mole of a polyoxyalkylene diamine of the formula

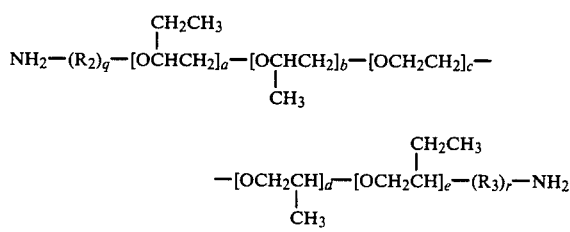

where $R_2$ and $R_3$ are $C_1-C_{12}$ alkylene groups, preferably $C_2-C_6$ alkylene groups, q and r are integers having a value of 0 or 1, preferably with $q=1$ and $r=0$, c has a value from about 2–150, preferably 2–50, $b+d$ has a Value from about 0–150, preferably 2–50 and $a+e$ has a value from about 0–100, preferably 2–8 with the proviso that there be a positive value for at least one of $b+d$ and $a+e$.

The motor fuel composition of the instant invention comprises a mixture of hydrocarbons boiling in the range of 90 F.–450~F. comprising from about 0.0005–5.0, preferably 0.001–1.0 weight percent of the abovedescribed reaction product, and, if employed, 0.001–1.0, preferably 0.01–0.5 weight percent of an optional polymeric component which is a polyolefin polymer or copolymer, or corresponding aminated or hydrogenated polymer or copolymer, or mixtures thereof, of a $C_2-C_{10}$, preferably a $C_2-C_6$ hydrocarbon. In a preferred embodiment, the polymeric component is a mixture or a major amount of polyisobutylene ethylene diamine and a minor amount of polyisobutylene in admixture with a suitable amount of hydrocarbon solvent. The motor fuel composition of the instant invention may additionally comprise 0.001–1.0, preferably 0.01–0.5 weight percent of a natural or synthetic lubricating oil.

This invention is also directed to an additive concentrate comprising a hydrocarbon solvent in admixture with 0.1–10.0 weight percent of the abovedescribed reaction product component and 25.0–75.0 weight percent of the abovedescribed polymer/copolymer-hydrocarbon solvent mixture. Concentrates of the instant invention exhibit improved storage stability and resistance to precipitation.

BRIEF DESCRIPTION OF THE DRAWINGS

Referring now to the drawings, FIG. 1 is a graphical representation of data obtained which compares the octane requirement (as a function of hours of engine operation) of a Chevrolet 2.0 liter engine initially using an commercial unleaded base fuel containing 60 PTB of a commercial fuel additive, and the octane requirement of the identical engine after engine disassembly, reassembly, stabilization and introduction of the instant invention.

FIG. 2 is a graphical representation of data obtained which compares: (i) the octane requirement (as a function of hours of engine operation) of a Chevrolet 2.0 liter engine using an unleaded base fuel containing 60 PTB of a commercial fuel additive; and (ii) the octane requirement of the identical engine using a motor fuel composition of the instant invention which additionally comprises a commercial fuel additive.

DETAILED EMBODIMENTS OF THE INVENTION

The ORI-inhibiting additive of the invention is a reaction product prepared by reacting a hydrocarbyl-substituted dibasic acid anhydride and a diamine containing block copolymers with polyoxyalkylene backbones. The hydrocarbyl-substituted dibasic acid anhydride reactant used to prepare the reaction product additive of the instant invention may be represented by the formula

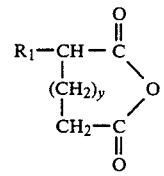

where $R_1$ is a hydrocarbyl radical, preferably a polypropenyl or polybutenyl radical, most preferably a polyisobutenyl radical, having a molecular weight range of 500–10,000, preferably 500–2500, most preferably 600–1500, say about 1290, and y has a value of 0–3. Where $R_1$ is the preferred polyisobutenyl radical, y preferably has a value of 0, and the preferred hydrocarbyl-substituted dibasic anhydride reactant for use is therefore a polyisobutenyl succinic acid anhydride of the formula:

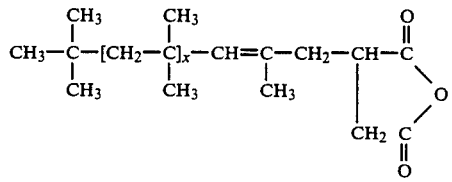

where x has a value of 10–20, preferably 20–25. This polyisobutenyl succinic acid anhydride is most preferably formed by reacting maleic anhydride and a polybutene such as a polybutene commercially available from Amoco Chemical Company under the INDOPOL series trade name, the most preferred polybutene reactant being commercially available as INDOPOL H-300. Methods of formulating the abovedescribed polyisobutyenyl succinic acid anhydride reactant are disclosed in, inter alia, U.S. Pat. Nos. 4,496,746 (Powell), 4,431,825 (Powell), 4,414,397 (Powell), and 4,325,876 (Chafetz), all incorporated herein by reference.

The polyoxyalkylene diamine reactant used to prepare the reaction product component of the instant invention is a diamine of the formula

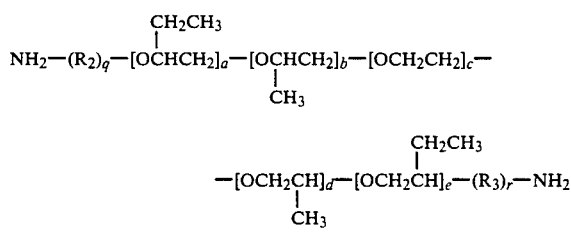

where $R_2$ and $R_3$ are $C_1$-$C_{12}$ alkylene groups, preferably $C_2$-$C_6$ alkylene group, most preferably a propylene or butylene group, q and r are integers having a value of 0 or 1, preferably with q=1 and r=0, c has a value from about 2-150, preferably 2-50; b+d has a value from about 0-150, preferably 2-50; and a+e has a value from about 0-100, preferably 2-8, with the proviso that there be a positive value for at least one of b+d and a+e. In one preferred embodiment, q=1, r=0, $R_2$ is a butylene group and the polyoxyalkylene diamine reactant is therefore of the formula

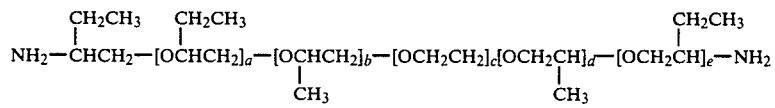

where c has a value of from 2-150, preferably 2-50, b+d has a value of from 0-150, preferably 2-50 and a+e has a value of 0-100, preferably 2-8.

In another preferred embodiment, q=1, r=0, $R_2$ is a propylene group, a+e has a value of zero, and the polyoxyalkylene diamine reactant is therefore of the formula $$NH_2-CHCH_2-[OCHCH_2]_b[OCH_2CH_2]_c[OCH_2CH]_d-NH_2$$
$$\quad\quad\quad | \quad\quad\quad\quad | \quad\quad\quad\quad\quad\quad\quad\quad\quad |$$
$$\quad\quad CH_3 \quad\quad\quad CH_3 \quad\quad\quad\quad\quad\quad\quad CH_3$$

where c and b+d, respectively, have a value of from 2-150, preferably 2-50. Polyoxyalkylene diamines of the above structure suitable for use include those available from Texaco Chemical Co. under the JEFFAMINE ED-Series trade name. Specific examples of such compounds are set forth below:

| Trade Name | Approx. Value c | Approx. Value b + d | Approx. Mol. Wt. |
|---|---|---|---|
| ED-600 | 8.5 | 2.5 | 600 |
| ED-900 | 15.5 | 2.5 | 900 |
| ED-2001 | 40.5 | 2.5 | 2000 |
| ED-4000 | 86.0 | 2.5 | 4000 |
| ED-6000 | 131.5 | 2.5 | 6000 |

The reaction product component of the instant invention is prepared by reacting 1.5-2.5 moles, preferably 2 moles of hydrocarbyl-substituted dibasic acid anhydride with 0.5-1.5 moles, preferably mole of the prescribed polyoxyalkylene diamine reactant, at a temperature of 30 C.-200 C., preferably 90 C.-150 C. until all of the water has been removed from the system. The reaction is preferably carried out in the presence of a solvent. A preferred solvent is one which will distill with water azeotropically. Suitable solvents include hydrocarbons boiling in the gasoline boiling range of about 30° C. to about 200° C. Generally, this will include saturated and unsaturated hydrocarbons having from about 5 to about 10 carbon atoms. Specific suitable hydrocarbon solvents include hexane, cyclohexane, benzene, toluene, and mixtures thereof. Xylene is the preferred solvent. The solvent can be present in an amount of up to about 90% by weight of the total reaction mixture. Once the reaction has been completed, the reaction product can then be separated from the solvent using conventional means, or left in admixture with some or all of the solvent.

The following examples illustrate the preferred method of preparing the reaction product of the instant invention. It will be understood that the following examples are merely illustrative, and are not meant to limit the invention in any way. In the examples, all parts are parts by weight unless otherwise specified.

EXAMPLE I 408 parts of polyisobutenyl succinic acid anhydride (prepared by reacting maleic annycrrce and INDOPOL H-300), 779 parts of xylene, and 374.6 parts of a polyoxyalkylene diamine were reacted at a temperature of about 90°-150° C. until no more water could be removed from the system. The polyoxyalkylene diamine was of the formula

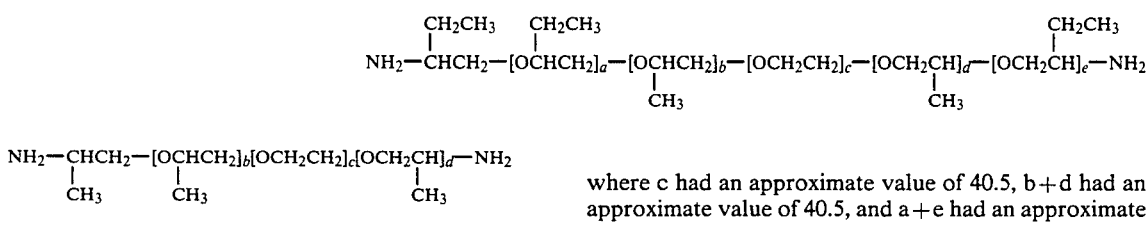

where c had an approximate value of 40.5, b+d had an approximate value of 40.5, and a+e had an approximate value of 2.5. The reaction product was then filtered and stripped of remaining solvent under vacuum, and identified by IR, NMR, and elemental analysis.

EXAMPLE II 2776 parts of polyisobutenyl succinic acid anhydride (prepared by reacting maleic anhydride and INDOPOL H-300), 4740 parts of xylene, and 2000 parts of a polyoxyalkylene diamine are reacted at a temperature of about 90°-150° C. until no more water can be removed from the system. The polyoxyalkylene diamine (JEFFAMINE ED-2001) may be represented by the formula

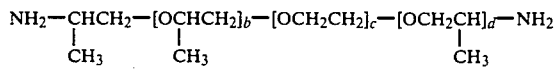

where c has an approximate. value of 40.5, and b+d has an approximate value of 2.5.

Example I exemplifies the preferred method of forming and the preferred reaction product component of the instant invention. It is hypothesized that the active portion of the reaction product composition of Example I is a bis-polyisobutenyl succinimide having the structure:

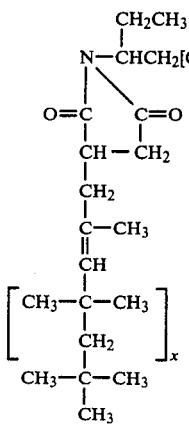

where x has a value of 21, c has an approximate value of 40.5, and a+e has an approximate value of 2.5.

The optional polymeric component of the motor fuel composition of the instant invention is a polyolefin polymer, copolymer, or corresponding aminated or hydrogenated polymer or copolymer, or mixtures thereof, of a $C_2$–$C_{10}$ hydrocarbon. The polymer/copolymer component is prepared from monoolefins and diolefins or copolymers thereof having an average molecular weight in the range from about 500–10,000, preferably 500–3500, most preferably about 650–2600. Mixtures of olefin polymers with an average molecular weight falling within the foregoing range are also effective. In general, the olefin monomers from which the polyolefin polymer component is prepared are preferably unsaturated $C_2$–$C_6$ hydrocarbons. Specific olefins which may be employed to prepare the polofin polymer component include ethylene, propylene, isopropylene, butylene, isobutylene, amylene, hexylene, butadi ne, and isoprene. Propylene, isopropylene, butylene, and isobutylene are particularly preferred for use in preparing the polyolefin polymer component. Other polyolefins which may be employed are those prepared by cracking polyolefin polymers or copolymers of high molecular weight to a polymer in the above-noted molecular weight range. Derivatives of the noted polymers obtained by saturating the polymers by hydrogenation or amination of the polymers to produce polymeric mono or polyamines are also effective and are a part of this invention. As used in this description and in the appended claims, the phrase "polymers" is intended to include the polyolefin polymers and their corresponding hydrogenated or aminated derivatives. The optional polymeric component is usually employed in admixture with a hydrocarbon solvent to facilitate its addition into a base motor fuel composition.

In one preferred embodiment of the instant invention, the optional polymeric component is polypropylene with an average molecular weight of 750–1000, preferably about 800. In another preferred embodiment, the optional polymeric component is polyisobutylene with an average molecular weight of 1000–1500, preferably about 1300. In yet another preferred embodiment of the instant invention, the optional polymeric component is a mixture of a major amount of polyisobutylene ethylene diamine and a minor amount of polyisobutylene in admixture with a suitable amount of hydrocarbon solvent. In this embodiment, the polyisobutylene ethylene diamine subcomponent of the optional polymeric component is typically present in a concentration range of

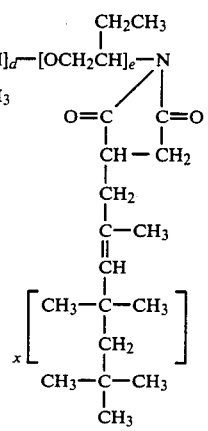

50–75 parts, preferably about 60 parts by weight, based upon the weight of the entire composition which makes up the polymeric component. The polyisobutylene ethylene diamine subcomponent is of the formula

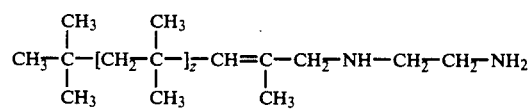

where z has a value of 10–40, preferably 30–35, say 33.

The polyisobutylene subcomponent of the optional polymeric component is typically present in a concentration range of 5–25 parts, preferably 10–20 parts by weight, based upon the weight of the entire composition which makes up the polymeric component. The polyisobutylene subcomponent is of the formula

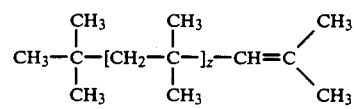

where z again has a value of 10–40, preferably 30–35, say 33.

The hydrocarbon solvent employed to facilitate admixture of the optional polymeric component into a base motor fuel composition is preferably a light aromatic distillate composition. A commercially available light aromatic distillate composition containing the abovedescribed polyisobutylene ethylene diamine and polyisobutylene compounds in the abovespecified concentrations and therefore most preferred for use as the optional polymeric component of the instant invention is the commercial gasoline additive ORONITE OGA-472, available from Chevron Chemical Company. ORONITE OGA-472 is a composition containing approximately 60 parts by weight of polyisobutylene ethylene diamine, approximately 13 parts by weight polyisobutylene, and approximately 27 parts by weight light aromatic distillate, including xylene and $C_9$ alkylbenzenes. Fuel compositions containing ORONITE OGA-472 as an additive include those described in U.S. Pat. Nos. 4,141,693, 4,028,065, and 3,966,429.

The motor fuel composition of the instant invention comprises a major amount of a base motor fuel and 0.0005–5.0 weight percent, preferably 0.001–1.0 weight percent of the abovedescribed reaction product. The fuel may also optionally comprise 0.001–1.0 weight percent, preferably 0.01–0.5 weight percent of the abovedescribed optional polymeric component. Preferred base motor fuel compositions are those intended for use in spark ignition internal combustion engines. Such motor fuel compositions, generally referred to as gasoline base stocks, preferably comprise a mixture of hydrocarbons boiling in the gasoline boiling range, preferably from about 90° F. to about 450° F. This base fuel may consist of straight chains or branched chains or paraffins,.cycloparaffins, olefins, aromatic hydrocarbons, or mixtures thereof. The base fuel can be derived from, among others, straight run naphtha, polymer gasoline, natural gasoline, or from catalytically cracked or thermally cracked hydrocarbons and catalytically reformed stock. The composition and octane level of the base fuel are not critical and any conventional motor fuel base can be employed in the practice of this invention. An example of a motor fuel composition of the instant invention is set forth in Example III, below.

EXAMPLE III

30 PTB of the reaction product set forth in Example I (i.e. 30 pounds of reaction product per 1000 barrels of gasoline, equivalent to about 0.01 weight percent of reaction product based on the weight of the fuel composition) is blended with a major amount of a base motor fuel (herein designated as Base Fuel A) which is a premium grade gasoline essentially unleaded (less than 0.05 g of tetraethyl lead per gallon), comprising a mixture of hydrocarbons boiling in the gasoline boiling range consisting of about 22% aromatic hydrocarbons, 11% olefinic carbons, and 67% paraffinic hydrocarbons, boiling in the range from about 90° F. to 450° F.

The ORI tendencies of Base Fuel A containing 60 PTB of a commercial fuel additive (60 pounds of reaction product per 1000 barrels of gasoline, equivalent to about 0.02 weight percent of reaction product based on the weight of the fuel composition), as well as a motor fuel composition comprising a concentrate of the instant invention, as exemplified by Example IV, below, were measured in an Engine Clean-Up Test.

EXAMPLE IV

30 PTB of the reaction product set forth in Example I (i.e. 30 pounds of reaction product per 1000 barrels of gasoline, equivalent to about 0.01 weight percent of reaction product component based on the weight of the fuel composition) and 205.5 PTB (about 0.07 weight percent) of a composition (ORONITE OGA-472) containing approximately 60 parts by weight polyisobutylene ethylene diamine, approximately 13 parts by weight polyisobutylene, and approximately 27 parts by weight light aromatic distillate comprising xylene and $C_9$ alkylbenzenes were blended with 100 Pale oil.

In the Engine Clean-Up Test, the ORI tendencies of Base Fuel A containing 60 PTB of a commercial fuel additive were measured in a 2.0 liter 1983 Chevrolet (Throttle Body Injector) multicylinder engine. The engine is a 2.0 liter Chevrolet in-line four cylinder engine with a cast alloy iron cylinder head having separate intake and exhaust ports for each cylinder. An electronically controlled fuel injection system maintains the required fuel flow to each engine cylinder by monitoring various engine operating parameters (e.g. manifold absolute pressure, throttle valve position, coolant temperature, engine r.p.m., and exhaust gas oxygen content) and adjusting the fuel flow accordingly. The fuel system supplying fuel to the engine is specifically adapted for the determination of engine ORI. At the beginning of the engine rating procedure, a fuel with an octane rating high enough to ensure that no audible engine knock is present is employed. The next lower octane fuel is then switched with the previous fuel, and this procedure continues until a knock becomes audible. The octane level one number above knock is the engine octane requirement. Engine ORI for the motor fuel composition comprising Base Fuel A plus 60 PTB commercial additive was determined as a function of hours of engine operation until 200 hours of engine operation, whereupon the engine was disassembled and rated. The reassembled engine was then restarted and stabilized, at which point the concentrate composition of the instant invention (as exemplified by Example IV) was introduced into the composition comprising Base Fuel A plus 60 PTB commercial fuel additive.

As illustrated by FIG. 1, the octane requirement of the engine using the commercial gasoline was approximately a value of 92 at the time the engine was disassembled. After engine reassembly, restabilization, and introduction of the instant invention, the engine octane requirement was reduced from a value of about 92 at 300 hours of engine operation to a value of about 87 at 400 hours of engine operation. The data set forth in FIG. 1 thus indicate that a motor fuel composition of the instant invention has reduced ORI tendencies in comparison with a typical commercially available gasoline.

The ORI tendencies of Base Fuel A containing 60 PTB of a commercial fuel additive and a motor fuel composition of the instant invention (as exemplified by Example V, below) which additionally comprises 60 PTB of a commercial fuel additive were also compared in an Engine Keep Clean Test.

EXAMPLE V

A motor fuel composition was prepared by blending Base Fuel A with 120 ppm (about 0.01 weight percent) of the reaction product set forth in Example I, 60 PTB (about 0.02 weight percent) of a commercial fuel additive, and 822 ppm (about 0.07 weight percent) of a composition (ORONITE OGA-472) containing approximately 60 parts by weight polysobutylene ethylene diamine, approximately 13 parts by weight polyisobutylene, and approximately 27 parts by weight light aromatic distillate comprising xylene and $C_9$ alkylbenzenes.

In the Engine Keep Clean Test, engine octane requirement for a 2.0 liter 1983 Chevrolet (Throttle Body Injector) engine as a function of hours of engine operation was measured using the idehtical apparatus described for the Engine Clean Up Test. The experimental results obtained from the Keep Clean Test for Base Fuel A containing 60 PTB commercial fuel additive and for a motor fuel composition of the instant invention (as exemplified by Example V) are set forth in FIG. 2. As illustrated by FIG. 2, the octane requirement of the engine using Base Fuel A containing 60 PTB of commercial fuel additive was consistently higher than the corresponding octane requirement of the engine using a motor fuel composition of the instant invention (Example V) over the test duration period. The data set forth in FIG. 2 thus indicate that a motor fuel composition of th instant invention is advantageous over a commercial fuel composition in terms of controlling engine ORI.

It has also been found that motor fuel compositions of the instant invention are effective in resisting the accumulation of deposits in the carburetor, intake manifold, and intake valves of internal combustion engines. The carburetor intake valve and intake manifold detergency properties of a commercially available motor fuel and a motor fuel composition of the instant invention (Example V) were measured via the Merit Rating Test. This test may be described as follows. After running a Chevrolet 2.0 liter engine with a given motor fuel composition, portions of the engine are disassembled and various engine components are visually examined to determine the extent of deposit formation. This is determined via a visual rating system scaled from 1–10, with a value of 10 being a clean component and a value of 1 being a deposit-laden component.

The experimental results obtained from the Merit Rating Test are set forth in Table I. As illustrated by Table I, a motor fuel composition of the instant invention (Example V) was approximately as effective (based upon merit ratings) as a commercially available fuel, and additionally showed improved valve deposit control.

TABLE I

1983 Chevrolet 2.0 liter Engine Merit Rating Results

| | Instant Invention (Example V) | Base Fuel A + 60 PTB Commercial Additive |
|---|---|---|
| DURATION OF TEST (HRS.) | 200 | 200 |
| MERIT RATINGS:* | | |
| TBI BODY | 8.3 | 9.7 |
| TBI PLATE | 8.1 | 8.6 |
| MANF. RUNNER | 9.5 | 7.5 |
| HEAD RUNNER | 8.5 | 7.3 |
| HEAD PORTS | 8.3 | 6.2 |
| VALVES | 8.0 | 6.5 |
| COMB. CHMBR. | 7.9 | 7.5 |
| PISTONS | 8.0 | 8.0 |

*Merit Rating of 10 = clean (no deposits)

For convenience in shipping and handling, it is useful to prepare a concentrate of the reaction product, either alone or together with the optional polymeric component of the instant invention. The concentrate may be prepared in a suitable liquid solvent such as toluene and xylene, with xylene being preferred. In a preferred mode of preparing a concentrate of the instant invention, approximately 0.1–10.0, preferably 5.0–10.0 weight percent of the reaction product of Example I, and approximately 25.0–75.0, preferably 50.0–60.0 weight percent of the abovedescribed aromatic distillate-polyisobutylene ethylene diamine-polyisobutylene mixture are employed in admixture with 25.0–50.0, preferably 30.0–40.0 weight percent of aromatic hydrocarbons, preferably xylene. All weight percents are based upon the total weight of the concentrate. As previously noted, concentrate compositions of the instant invention are advantageous over ORI-control concentrate formulations such as that disclosed in co-assigned U.S. patent application Ser. No. 84,354 (Sung et al.) in that concentrate compositions of this invention resist precipitation and hence may be more readily stored and transported.

Motor fuel and concentrate compositions of the instant invention may additionally comprise any of the additives generally employed in motor fuel compositions. Thus, compositions of the instant invention may additionally contain conventional carburetor detergents, anti-knock compounds such as tetraethyl lead compounds, anti-icing additives, upper cylinder lubricating oils, and the like. In particular, such additional additives may include compounds such as polyolefin polymers, copolymers, or corresponding hydrogenerated polymers or copolymers of $C_2$–$C_6$ unsaturated hydrocarbons, or mixtures thereof. Additional additives may include substituted or unsubstituted monoamine or polyamine compounds such as alkyl amines, ether amines, and alkyl-alkylene amines or oombinations thereof.

In another preferred embodiment, the motor fuel composition of the instant invention additionally oomprises 0.001–1.0, preferably 0.01–0.5 weight percent of a natural or synthetic lubricating oil. Suitable lubricating oils for use in the motor fuel composition of the instant invention are described, for example, at columns 29–30 of U.S. Pat. No. 4,670,173 (Hayashi et al.) (incorporated herein by reference) and include natural oils such as animal oils, vegetable oils, mineral lubricating oils (e.g. liquid petroleum oils, solvent-treated and acid-treated mineral oils of paraffinic, napthenic, and mixed paraffinic-napthenic types), and lubricating oils derived from shale or coal.

Synthetic oils suitable for use include hydrocarbon oils, halo-substituted hydrocarbon oils such as polymerized and interpolymerized olefins, oligo-alkenes, alkylbenzenes, polyphenyls, alkylated diphenyl ethers and sulfides, and substituted and unsubstituted alkylene oxide polymers and copolymers (e.g. oils prepared through polymerization of ethylene oxide or propylene oxide, the alkyl and aryl ethers of these polyoxyalkylene polymers, or mono- and polycarboxylic esters thereof such as acetic acid or fatty acid esters). A particularly preferred class of synthetic lubricating oils suitable for use comprises esters and polyesters of mono- and dicarboxylic acids and mixtures thereof.

Another particularly preferred class of oils for use is unrefined or refined heavy oils. Unrefined oils are those obtained directly from a natural or synthetic source without further purification treatment. Refined oils are similar to unrefined oils except they have been further treated in one or more purification steps to improve one or more properties. Many such purification techniques (e.g. solvent extraction, secondary distillation, acid or base extraction, filtration, percolation) are well known to those skilled in the art.

This invention is also directed to a method of blending the reaction product compdsition, either alone or in combination with the abovedescribed optional polyolefin polymer/copolymer component, into a base motor fuel composition. The method of blending comprises introducing into the base fuel, which is a major amount of hydrocarbons boiling in the range from about 90° F.–450° F., from 0.0005–5.0, preferably 0.001–1.0 weight percent of the abovedescribed reaction product of the instant invention. The reaction product may be directly introduced into the hydrocarbon base fuel, or it may first be admixed with a hydrocarbon solvent such as xylene, toluene, hexane, cyclohexane, benzene, and mixtures thereof.

If the optional polyolefin polymer/copolymer component is employed, the abovedescribed method of blending comprises introducing into the base fuel 0.0005–5.0, preferably 0.001–1.0 weight percent of the abovedescribed reaction product and from 0.001–1.0, preferably 0.01-0.5 weight percent of the abovedescribed optional polyolefin polymer/copolymer component. The polymer/copolymer component may be directly introduced into the hydrocarbon base fuel, or it may first be admixed with a hydrocarbon solvent such as toluene, xylene, or a $C_2$-$C_{10}$ alkylbenzene.

In another embodiment of the abovedescribed method of blending, the blending is accomplished by introducing into the base fuel the abovedescribed concentrate composition of the instant invention, the concentrate comprising the abovedescribed reaction product either alone or in combination with the optional polyolefin polymer/copolymer component.

It will be evident that the terms and expressions employed herein are used as terms of description and not of limitation. There is no intention, in the use of these descriptive terms and expressions, of excluding equivalents of the features described and it is recognized that various modifications ar possible within the scope of the invention claimed.

The invention claimed is:

1. A bisimide composition obtained by reacting, at a temperature of 30 C.-200 C.:
   (a) 1.5-2.5 moles of a hydrocarbyl-substituted dibasic acid anhydride of the formula

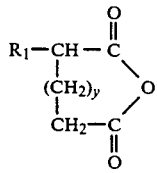

where $R_1$ is a hydrocarbyl radical having a molecular weight range of 500-10,000 and y has a value of 0-3; and
   (b) 0.5-1.5 moles of a polyoxyalkylene diamine of the formula

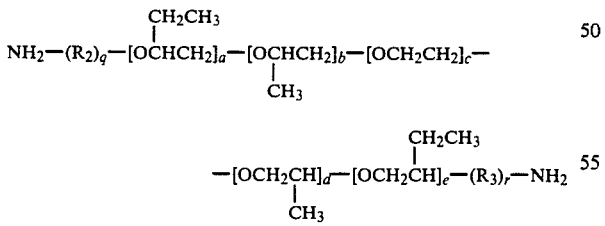

where $R_2$ and $R_3$ are $C_1$-$C_{12}$ alkylene groups, q and r are integers having a value of 0 or 1, c has a value from 2-150, b+d has a value from 0-150, and a+e has a value from 0-100 with the proviso that there be a positive value for at least one of b+d and a+e.

2. A composition according to claim 1, where $R_1$ is a polypropenyl or polybutenyl group with a molecular weight range of 500-2500.

3. A composition according to claim 2, where $R_1$ has a molecular weight range of 600-1500.

4. A composition according to claim 2, where $R_1$ is a polyisobutenyl group with a molecular weight of about 1290.

5. A composition according to claim 1, where said hydrocarbyl-substituted dibasic acid anhydride reactant is a polyisobutenyl succinic acid anhydride of the formula:

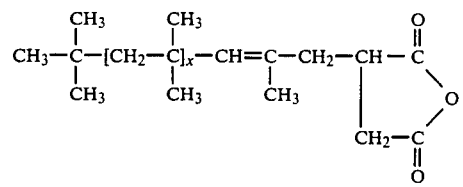

where x has a value of 10-30.

6. A composition according to claim 5, where x has a value of 20-25.

7. A composition according to claim 1, where said polyoxyalkylene diamine reactant is of the formula

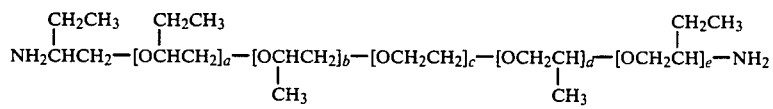

where c has a value from about 2-50, b+d has a value from about 2-50, and a+e has a value from about 2-8.

8. A composition according to claim 1, where said polyoxyalkylene diamine reactant is of the formula

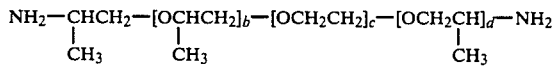

where c has a value of 2-50, and b+d has a value of 2-50.

9. A composition according to claim 1, in which the reaction product component is formulated by reacting 2 moles of said hydrocarbyl-substituted dibasic acid anhydride reactant with 1 mole of said polyoxyalkylene diamine reactant.

10. A motor fuel composition comprising a mixture of hydrocarbons boiling in the range from about 90 F.-450 F. and additionally comprising from 0.0005-5.0 weight percent of the bisimide reaction product obtained by reacting, at a temperature of 30°-200° C.:
   (a) 1.5-2.5 moles of a hydrocarbyl-substituted dibasic acid anhydride of the formula

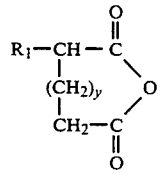

where $R_1$ is a hydrocarbyl radical having a molecular weight range of 500-10,000 and y has a value of 0-3; and
   (b) 0.5-1.5 moles of a polyoxyalkylene diamine of the formula

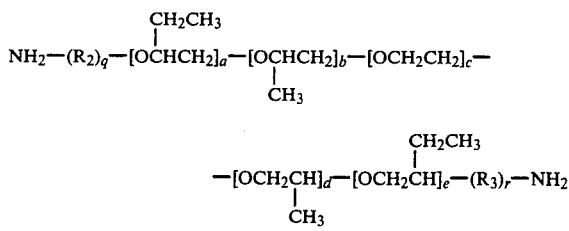

where $R_2$ and $R_3$ are $C_1$-$C_{12}$ alkylene groups, q and r are integers having a value of 0 or 1, c has a value from 2-150, b+d has a value from 0-150, and a+e has a value from 0-100 with the proviso that there be a positive value for at least one of b+d and a+e.

11. A motor fuel composition according to claim 10, where $R_1$ is a polypropenyl or polybutenyl group with a molecular weight range of 500-2500.

12. A motor fuel composition according to claim 11, where $R_1$ has a molecular weight range of 500-1500.

13. A motor fuel composition according to claim 11, where $R_1$ is a polyisobutenyl group has a molecular weight of about 1290.

14. A motor fuel composition according to claim 10, where said hydrocarbyl-substituted dibasic acid anhydride reactant is a polyisobutenyl succinic acid anhydride of the formula:

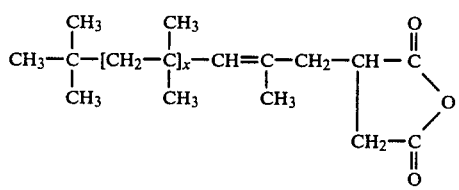

where x has a value of 10-30.

15. A motor fuel composition according to claim 14, where x has a value of 20-25.

16. A motor fuel composition according to claim 10, where said polyoxyalkylene diamine reactant is of the formula

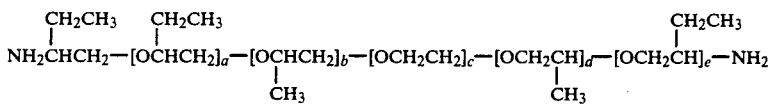

where c has a value from about 2-50, b+d has a value from about 2-50, and a+e has a value from about 2-8.

17. A motor fuel composition according to claim 10, where said polyoxyalkylene diamine reactant is of the formula

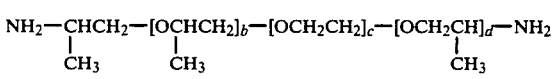

where c has a value of 2-50, and b+d has a value of 2-50.

18. A composition according to claim 10, in which the reaction product component is formulated by reacting 2 moles of said hydrocarbyl-substituted dibasic acid anhydride reactant with 1 mole of said polyoxyalkylene diamine reactant.

19. A motor fuel composition comprising a mixture of hydrocarbons boiling in the range from about 90° F.-450° F., and additionally comprising from about 0.001-1.0 weight percent of the reaction product obtained by reacting, at a temperature of 90° C.-150° C.:

(a) 2 moles of a polyisobutenyl succinic acid anhydride of the formula

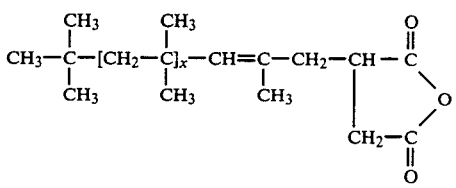

where x has a value of 20-25, and (b) 1 mole of a polyoxyalkylene diamine of the formula

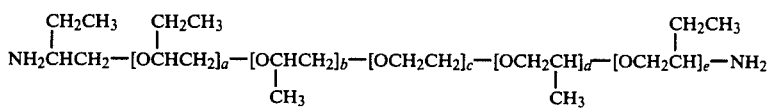

where c has a value from about 2-50, b+d has a value from about 2-50, and a+e has a value from about 2-8.

20. A motor fuel composition comprising a mixture of hydrocarbons boiling in the range from about 90° F.-450° F., and additionally comprising from about 0.001-1.0 weight percent of the reaction product obtained by reacting, at a temperature of 90° C.-150° C.:

(a) 2 moles of a polyisobutenyl succinic acid anhydride of the formula

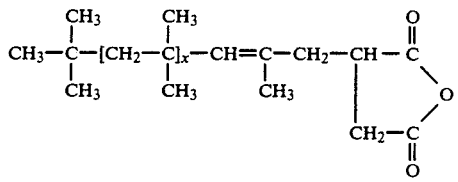

where x has a value of 20-25, and (b) 1 mole of a polyoxyalkylene diamine of the formula

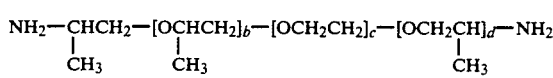

where c has a value from about 2-50, and b+d has a value from about 2-50.

21. A method of blending an ORI-inhibited motor fuel composition which comprises introducing into a major amount of a mixture of hydrocarbons boiling in the range from about 90 F.–450 F. from 0.0005–5.0 weight percent of the bisimide reaction product obtained by reacting, at a temperature of 30°–200° C.:

(a) 1.5–2.5 moles of a hydrocarbyl-substituted dibasic acid anhydride of the formula $$R_1-CH-C\underset{O}{\overset{O}{\parallel}}\diagdown$$
$$(CH_2)_y\quad O$$
$$CH_2-C\underset{O}{\overset{\parallel}{\diagup}}$$

where $R_1$ is a hydrocarbyl radical having a molecular weight range of 500–10,000 and y has a value of 0–3; and (b) 0.5–1.5 moles of a polyoxyalkylene diamine of the formula $$NH_2-(R_2)_q-[OCHCH_2]_a-[OCHCH_2]_b-[OCH_2CH_2]_c-$$
with $CH_2CH_3$ on first unit and $CH_3$ on second unit $$-[OCH_2CH]_d-[OCH_2CH]_e-(R_3)_r-NH_2$$
with $CH_3$ and $CH_2CH_3$ substituents where $R_2$ and $R_3$ are $C_1$–$C_{12}$ alkylene groups, q and r are integers having a value of 0 or 1, c has a value from 2–150, b+d has a value from 0–150, and a+e has a value from 0–100 with the proviso that there be a positive value for at least one of b+d and a+e has a positive value.

22. A method according to claim 21 where $R_1$ is a polypropenyl or polybutenyl group with a molecular weight range of 500–2500.

23. A method according to claim 21 where $R_1$ is a polyisobutenyl group with a molecular weight range of 600–1500.

24. A method according to claim 21 where $R_1$ is a polyisobutenyl group with a molecular weight of about 1290.

25. A method according to claim 21 where said hydrocarbyl-substituted dibasic acid anhydride reactant is a polyisobutenyl succinic acid anhydride of the formula:

$$CH_3-\underset{CH_3}{\overset{CH_3}{\underset{|}{\overset{|}{C}}}}-[CH_2-\underset{CH_3}{\overset{CH_3}{\underset{|}{\overset{|}{C}}}}]_x-CH=\underset{CH_3}{\overset{}{\underset{|}{C}}}-CH_2-CH-C\underset{O}{\overset{O}{\parallel}}\diagdown$$
$$O$$
$$CH_2-C\underset{O}{\overset{\parallel}{\diagup}}$$

where x has a value of 10–30.

26. A method according to claim 25, where x has a value of 20–25.

27. A method according to claim 21 where said polyoxyalkylene diamine reactant is of the formula $$NH_2CHCH_2-[OCHCH_2]_a-[OCHCH_2]_b-[OCH_2CH_2]_c-[OCH_2CH]_d-[OCH_2CH]_e-NH_2$$
with $CH_2CH_3$, $CH_2CH_3$, $CH_3$, $CH_3$, $CH_2CH_3$ substituents where c has a value from about 2–50, b+d has a value from about 2–50, and a+e has a value from about 2–8.

28. A method according to claim 21 where said polyoxyalkylene diamine reactant is of the formula $$NH_2-CHCH_2-[OCHCH_2]_b-[OCH_2CH_2]_c-[OCH_2CH]_d-NH_2$$
with $CH_3$, $CH_3$, $CH_3$ substituents where c has a value of 2–50, and b+d has a value of 2–50.

29. A method according to claim 21 where said reaction product is admixed with a hydrocarbon solvent prior to being introduced into said mixture of hydrocarbons boiling in the range from about 90° F.–450° F.

30. A motor fuel composition according to any of claim 10, 19 or 20 which additionally comprises 0.001–1.0 weight percent of a natural or synthetic lubricating oil.

31. A method of blending according to claim 21 which comprises additionally introducing 0.01–0.5 weight percent of a natural or synthetic lubricating oil into said mixture of hydrocarbons.

32. A motor fuel composition according to claim 30, where said lubricating oil is selected from the group consisting of esters and polyesters of mono- and dicarboxylic acids, and mixtures thereof.

33. A method of blending according to claim 31, where said lubricating oil is selected from the group consisting of esters and polyesters of mono- and dicarboxylic acids, and mixtures thereof.

34. A motor fuel composition according to claim 30, where said lubricating oil is a refined or unrefined heavy oil.

35. A method of blending according to claim 31, where said lubricating oil is a refined or unrefined heavy oil.

36. A motor fuel composition comprising a mixture of hydrocarbons boiling in the range from about 90° F.–450° F. and additionally comprising from 0.001–1.0 weight percent of a natural or synthetic lubricating oil and from 0.0005–5.0 weight percent of the bisimide reaction product obtained by reacting, at a temperature of 30° C.–200° C.:

(a) 1.5–2.5 moles of a hydrocarbyl-substituted dibasic acid anhydride of the formula $$R_1-CH-C\underset{O}{\overset{O}{\parallel}}\diagdown$$
$$(CH_2)_y\quad O$$
$$CH_2-C\underset{O}{\overset{\parallel}{\diagup}}$$

where $R_1$ is a hydrocarbyl radical having a molecular weight range of 500–10,000 and y has a value of 0–3; and (b) 0.5–1.5 moles of a polyoxyalkylene diamine of the formula

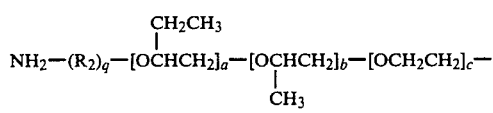
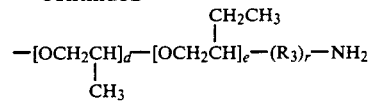
where $R_2$ and $R_3$ are $C_1$-$C_{12}$ alkylene groups, q and r are integers having a value of 0 or 1, c has a value from 2-150, b+d has a value from 2-150, and a+e has a value from 0-12.
* * * * *